US012663805B2

(12) United States Patent
Tokutake

(10) Patent No.: US 12,663,805 B2
(45) Date of Patent: Jun. 23, 2026

(54) INFORMATION PROCESSOR AND INFORMATION PROCESSING METHOD

(71) Applicant: SONY GROUP CORPORATION, Tokyo (JP)

(72) Inventor: Kenji Tokutake, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 85 days.

(21) Appl. No.: 18/682,980

(22) PCT Filed: Mar. 4, 2022

(86) PCT No.: PCT/JP2022/009307
§ 371 (c)(1),
(2) Date: Feb. 12, 2024

(87) PCT Pub. No.: WO2023/037594
PCT Pub. Date: Mar. 16, 2023

(65) Prior Publication Data
US 2024/0345592 A1 Oct. 17, 2024

(30) Foreign Application Priority Data
Sep. 8, 2021 (JP) ................................. 2021-146347

(51) Int. Cl.
G05D 1/249 (2024.01)
G05D 1/667 (2024.01)
(Continued)

(52) U.S. Cl.
CPC ............. G05D 1/249 (2024.01); G05D 1/667 (2024.01); *G05D 2105/285* (2024.01); *G05D 2109/254* (2024.01)

(58) Field of Classification Search
CPC .. G05D 1/249; G05D 1/667; G05D 2105/285; G05D 2109/254
(Continued)

(56) References Cited

U.S. PATENT DOCUMENTS

2016/0342934 A1* 11/2016 Michalik ............... H04W 4/024
2021/0125369 A1* 4/2021 Seyfi ................ G08B 13/19695

FOREIGN PATENT DOCUMENTS

JP 2018-081685 A 5/2018
JP 2018-095366 A 6/2018
(Continued)

OTHER PUBLICATIONS

International Search Report and Written Opinion of PCT Application No. PCT/JP2022/009307, issued on May 24, 2022, 09 pages of ISRWO.
(Continued)

*Primary Examiner* — Mahmoud S Ismail
(74) *Attorney, Agent, or Firm* — CHIP LAW GROUP

(57) ABSTRACT

An information processing apparatus includes a processor. The processor determines distance information associated with a destination based on global positioning system (GPS) data, switches from utilization of the GPS data to utilization of main data based on the distance information, executes a simultaneous localization and mapping (SLAM) process based on the main data and a 3D map of surroundings of the destination, and searches for a route to a destination using the SLAM process.

12 Claims, 14 Drawing Sheets

(51) Int. Cl.
   *G05D 105/28*        (2024.01)
   *G05D 109/25*        (2024.01)
(58) Field of Classification Search
   USPC ............................................................ 701/3
   See application file for complete search history.

(56)                        References Cited

FOREIGN PATENT DOCUMENTS

| | | | |
|---|---|---|---|
| JP | 2018-525756 | A | 9/2018 |
| JP | 2020-534198 | A | 11/2020 |
| JP | 2021-005267 | A | 1/2021 |
| WO | 2005/038402 | A1 | 4/2005 |

OTHER PUBLICATIONS

"Method of Using Drone Port for Logistics", Blue innovation Co., Ltd., National University Corporation the University of Tokyo, Jul. 16, 2021, 11 pages.
"Rakuten Drone", Rakuten Mobile, Jul. 16, 2021, URL: https://drone.rakuten.co.jp/.

* cited by examiner

SEARCH FOR ROUTE
TO DESTINATION

GENERATE 3D MAP OF
SURROUNDINGS OF
DESTINATION

FIG.5

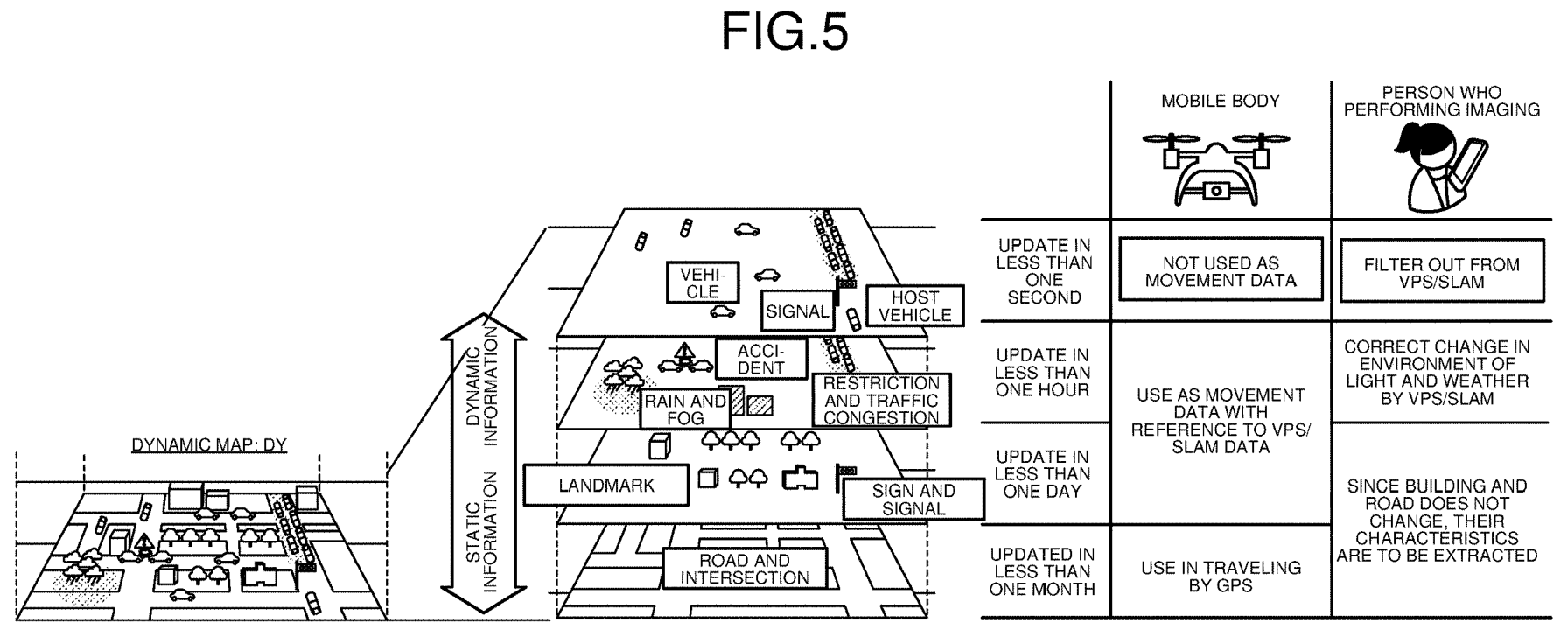

| | MOBILE BODY | PERSON WHO PERFORMING IMAGING |
|---|---|---|
| UPDATE IN LESS THAN ONE SECOND | NOT USED AS MOVEMENT DATA | FILTER OUT FROM VPS/SLAM |
| UPDATE IN LESS THAN ONE HOUR | USE AS MOVEMENT DATA WITH REFERENCE TO VPS/SLAM DATA | CORRECT CHANGE IN ENVIRONMENT OF LIGHT AND WEATHER BY VPS/SLAM |
| UPDATE IN LESS THAN ONE DAY | | SINCE BUILDING AND ROAD DOES NOT CHANGE, THEIR CHARACTERISTICS ARE TO BE EXTRACTED |
| UPDATED IN LESS THAN ONE MONTH | USE IN TRAVELING BY GPS | |

HOST VEHICLE

SIGNAL

RESTRICTION AND TRAFFIC CONGESTION

SIGN AND SIGNAL

VEHI-CLE

ACCI-DENT

RAIN AND FOG

LANDMARK

ROAD AND INTERSECTION

DYNAMIC INFORMATION

STATIC INFORMATION

DYNAMIC MAP: DY

FIG.7

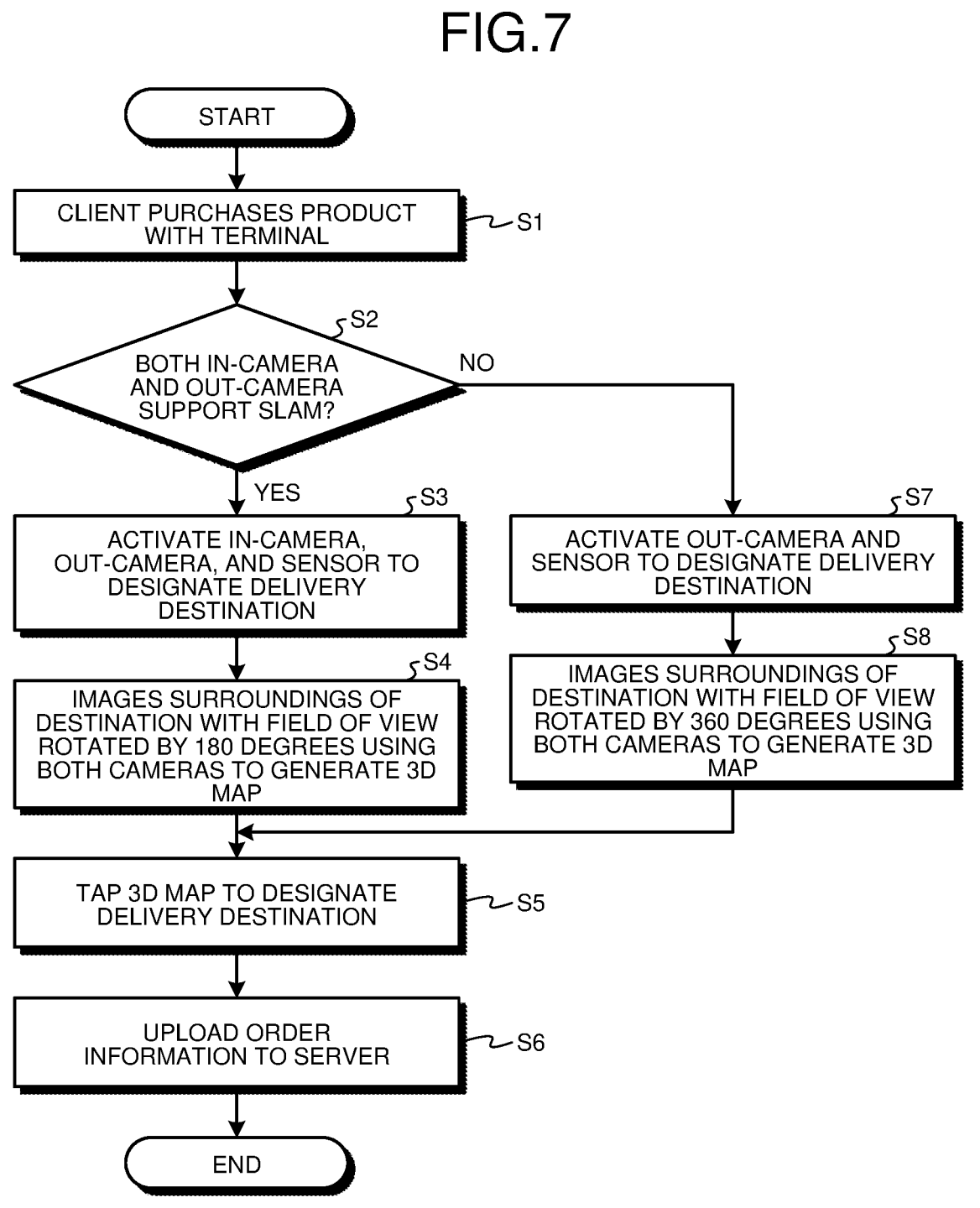

```
                    ( START )
                        │
                        ▼
        ┌──────────────────────────────┐
        │  CLIENT PURCHASES PRODUCT     │──S1
        │       WITH TERMINAL           │
        └──────────────────────────────┘
                        │
                        ▼
                    ╱‾‾‾‾‾‾‾‾‾‾╲  S2
                  ╱  BOTH IN-CAMERA ╲        NO
                 ⟨  AND OUT-CAMERA   ⟩───────────────┐
                  ╲ SUPPORT SLAM?   ╱                │
                    ╲_____╱                     │
                        │ YES                        │
                        ▼         S3                 ▼         S7
        ┌──────────────────────────────┐  ┌──────────────────────────────┐
        │     ACTIVATE IN-CAMERA,       │  │  ACTIVATE OUT-CAMERA AND      │
        │ OUT-CAMERA, AND SENSOR TO     │  │  SENSOR TO DESIGNATE DELIVERY │
        │    DESIGNATE DELIVERY         │  │        DESTINATION            │
        │      DESTINATION              │  └──────────────────────────────┘
        └──────────────────────────────┘                │
                        │         S4                     ▼         S8
        ┌──────────────────────────────┐  ┌──────────────────────────────┐
        │   IMAGES SURROUNDINGS OF      │  │   IMAGES SURROUNDINGS OF      │
        │ DESTINATION WITH FIELD OF VIEW│  │ DESTINATION WITH FIELD OF VIEW│
        │ ROTATED BY 180 DEGREES USING  │  │ ROTATED BY 360 DEGREES USING  │
        │ BOTH CAMERAS TO GENERATE 3D   │  │ BOTH CAMERAS TO GENERATE 3D   │
        │           MAP                 │  │           MAP                 │
        └──────────────────────────────┘  └──────────────────────────────┘
                        │◄────────────────────────────────┘
                        ▼
        ┌──────────────────────────────┐
        │   TAP 3D MAP TO DESIGNATE     │──S5
        │    DELIVERY DESTINATION       │
        └──────────────────────────────┘
                        │
                        ▼
        ┌──────────────────────────────┐
        │      UPLOAD ORDER             │──S6
        │   INFORMATION TO SERVER       │
        └──────────────────────────────┘
                        │
                        ▼
                    ( END )
```

SUFFICIENT FEATURE AMOUNT            MARKER REQUIRED

Figure 15:
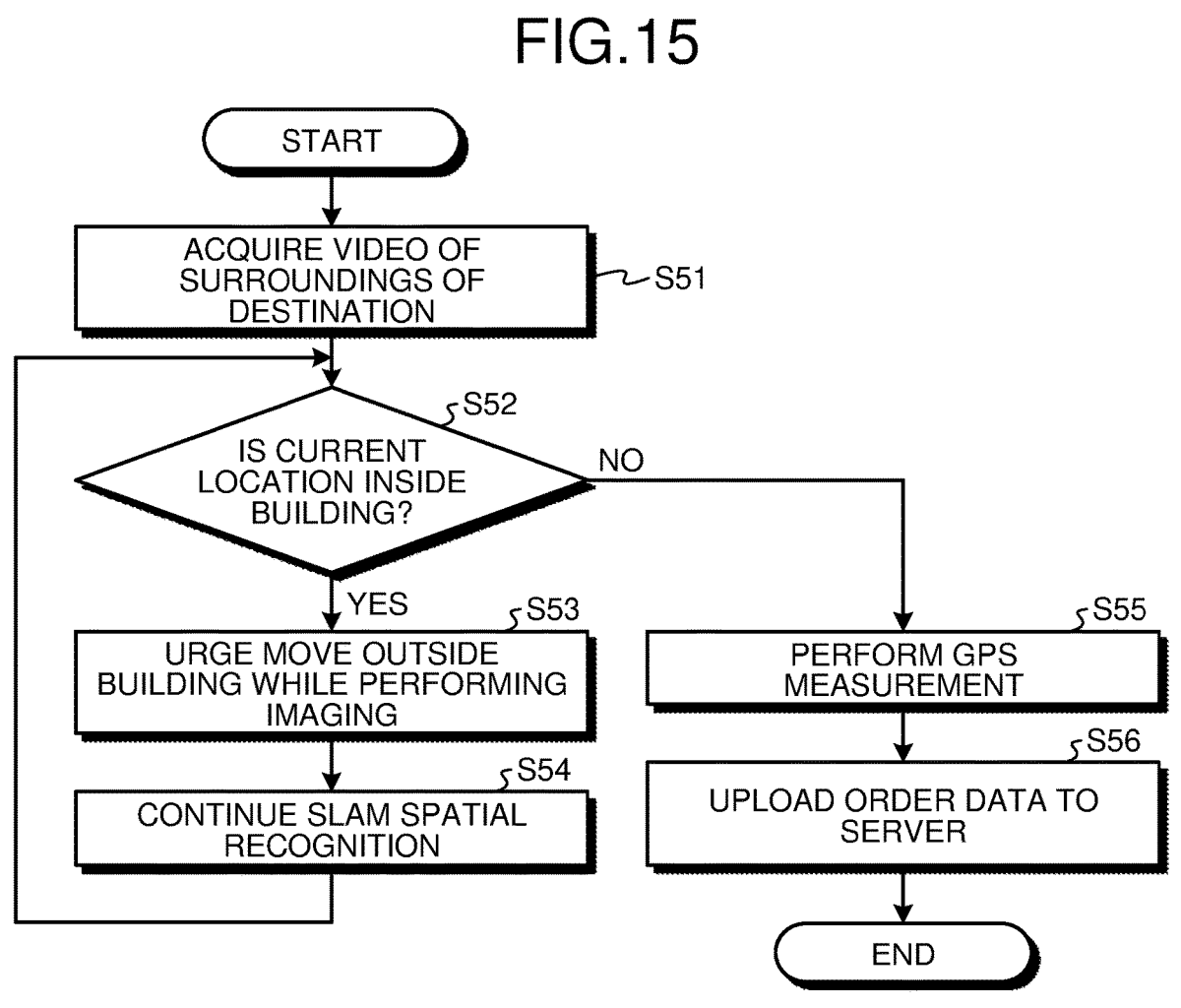

START

↓

ACQUIRE VIDEO OF
SURROUNDINGS OF
DESTINATION — S51

↓

IS CURRENT
LOCATION INSIDE
BUILDING? — S52

NO →

PERFORM GPS
MEASUREMENT — S55

↓

UPLOAD ORDER DATA TO
SERVER — S56

↓

END

YES ↓

URGE MOVE OUTSIDE
BUILDING WHILE PERFORMING
IMAGING — S53

↓

CONTINUE SLAM SPATIAL
RECOGNITION — S54

INFORMATION PROCESSOR AND INFORMATION PROCESSING METHOD

CROSS REFERENCE TO RELATED APPLICATIONS

This application is a U.S. National Phase of International Patent Application No. PCT/JP2022/009307 filed on Mar. 4, 2022, which claims priority benefit of Japanese Patent Application No. JP 2021-146347 filed in the Japan Patent Office on Sep. 8, 2021. Each of the above-referenced applications is hereby incorporated herein by reference in its entirety.

FIELD

The present invention relates to an information processing apparatus, an information processing method, and a program.

BACKGROUND

Technology development of the automatic operation and the automatic delivery is rapidly progressing. For example, for the automatic delivery using a drone, a demonstration experiment of a marker-based delivery system has been performed. In this type of delivery system, a marker serving as a mark is installed near the delivery destination. The drone searches for a flight route to the marker while detecting the marker with the vision camera.

CITATION LIST

Patent Literature

Patent Literature 1: JP 2021-005267 A
Patent Literature 2: JP 2020-534198 A

Non Patent Literature

Non-Patent Literature 1: Blue innovation Co., Ltd., National University Corporation the University of Tokyo, "Method of Using Drone Port for Logistics", [online], [searched on Jul. 16, 2021], the Internet <URL: https://www.mlit.go.jp/common/001154531.pdf>
Non-Patent Literature 2: [online], Rakuten Drone, [searched on Jul. 16, 2021], the Internet <URL: https://drone.rakuten.co.jp/>

SUMMARY

Technical Problem

It is considered that social implementation of a delivery system using a drone will proceed mainly in the distribution industry in the future. However, in the marker-based delivery system, a destination cannot be set at a position other than the marker. Therefore, there is a demand for a method of flexibly setting a destination and accurately searching for a route. Route search techniques are also utilized in other fields such as navigation. However, in the current technology, there is room for improvement in flexibility of destination setting and accuracy of route search.

Therefore, the present disclosure proposes an information processing apparatus, an information processing method, and a program capable of flexibly setting a destination and accurately searching for a route.

Solution to Problem

According to the present disclosure, an information processing apparatus is provided that comprises a processor that searches for a route to a destination using a 3D map of surroundings of the destination generated by a client using SLAM. According to the present disclosure, an information processing method in which an information process of the information processing apparatus is executed by a computer, and a program causing a computer to perform the information process of the information processing apparatus are provided.

BRIEF DESCRIPTION OF DRAWINGS

FIG. 5 is a diagram illustrating an example of a dynamic map.
FIG. 7 is a flowchart illustrating an example of a method of setting a destination.
FIG. 15 is a flowchart illustrating an example of a method of capturing a video.

DESCRIPTION OF EMBODIMENTS

Hereinafter, the embodiments of the present disclosure will be described in detail with reference to the drawings. In the following embodiments, the same parts are denoted by the same reference signs, and a duplicate description will be omitted.

Note that the description will be given in the following order.
[1. Overview of delivery system]
[2. 3D Map of surroundings of destination]
[3. System configuration example]
[4. Dynamic map]
[5. Route search]

[6. Information processing method]
[6-1. Setting of destination]
[6-2. Route search and package delivery]
[6-3. Installation of marker]
[6-4. Authentication of package recipient]
[6-5. Setting of travelling route inside building]
[7. Search for meeting place]
[8. Hardware configuration example]
[9. Effects]
[10. Modification]

1. Overview of Delivery System

Figure 1:
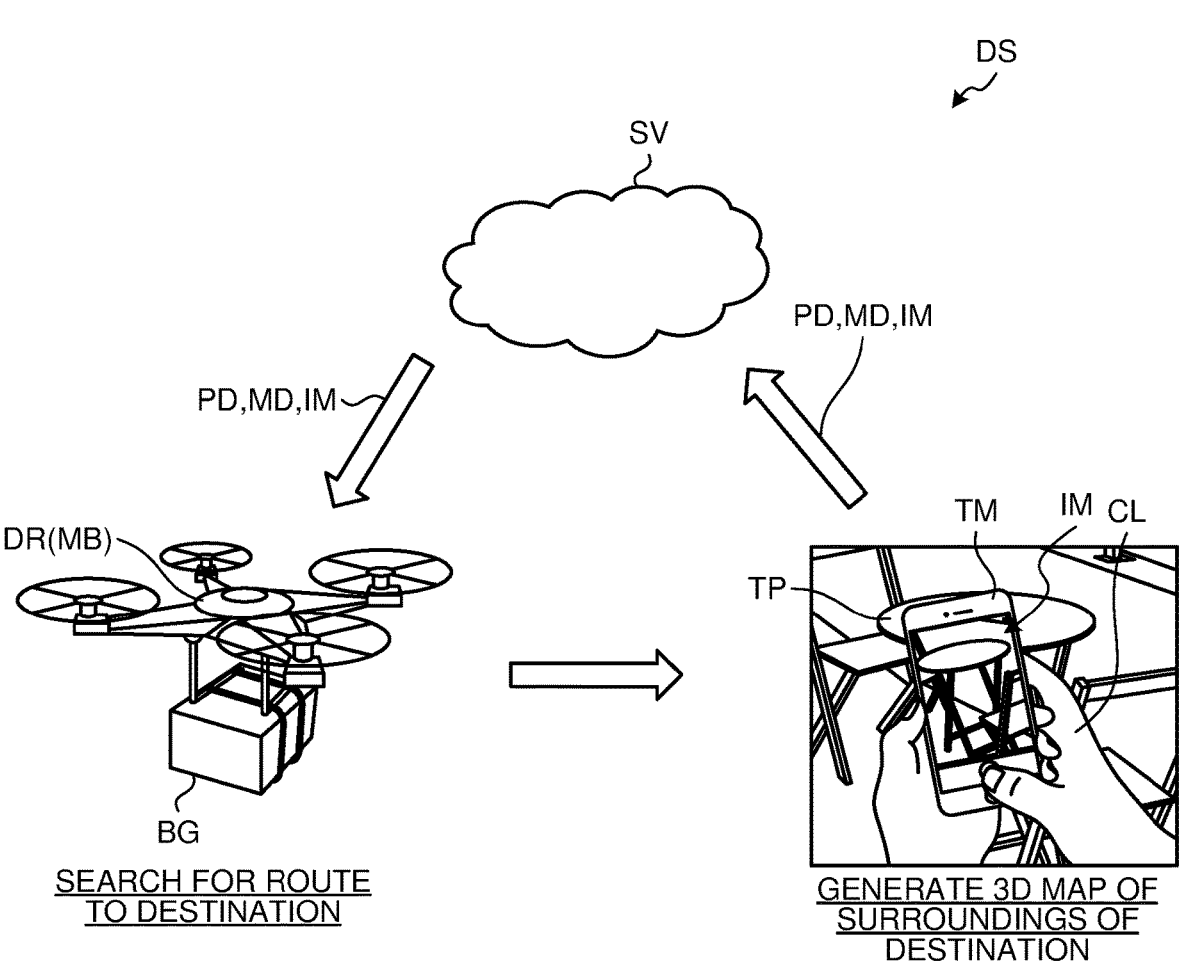
FIG. 1 is a diagram illustrating an example of a delivery system.

FIG. 1 is a diagram illustrating an example of a delivery system DS.

The delivery system DS is a system that automatically delivers a package BG using a mobile body MB such as a drone DR. The delivery system DS includes a server SV, a terminal TM, and the mobile body MB. A client CL that requests the delivery of the package BG sets a destination TP (delivery destination of the package BG) using the terminal TM such as a smartphone. A three-dimensional (3D) map MD of surroundings of the destination TP is used to set the destination TP.

For example, the client CL captures a video IM of surroundings of the destination TP using the terminal TM having a camera function. The terminal TM has a global positioning system (GPS) function. The video IM includes GPS data PD indicating a recording position of the video IM. The terminal TM generates a 3D map MD of surroundings of the destination TP using simultaneous localization and mapping (SLAM). The terminal TM transmits the video IM and the 3D map MD together with the GPS data PD to the server SV.

The server SV transmits the video IM, the 3D map MD, and the GPS data PD acquired from the terminal TM to the mobile body MB. The mobile body MB searches for a route to the surroundings of the destination TP based on the GPS data PD. When the mobile body MB moves to the surroundings of the destination TP, the mobile body MB searches for a detailed route to the destination TP using the video IM and the 3D map MD of surroundings of the destination TP. In the example of FIG. 1, the table on the veranda is the destination TP, and the package BG is a vase. The mobile body MB delivers the vase onto the table on the veranda.

2. 3D Map of Surroundings of Destination

Figure 2:
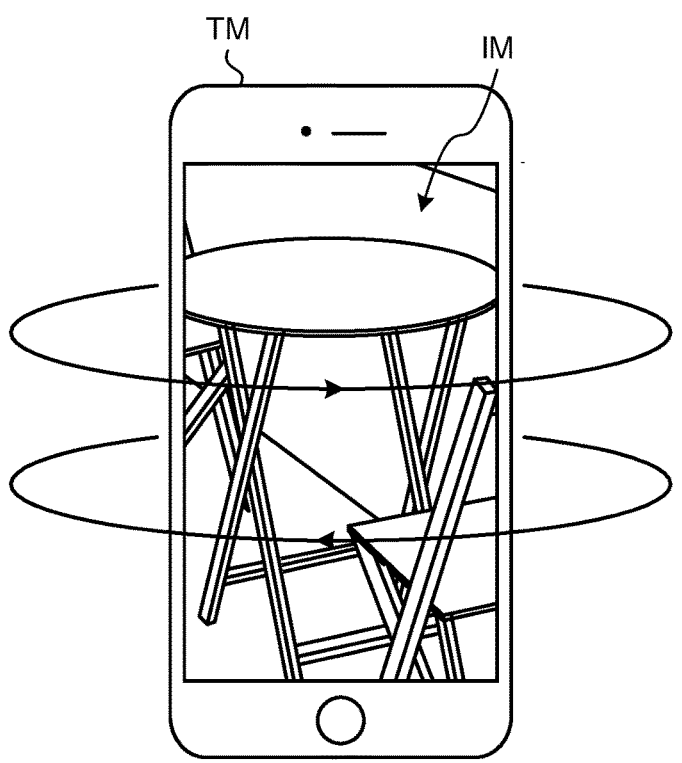
FIG. 2 is a diagram illustrating an example of a method of generating a 3D map.

FIG. 2 is a diagram illustrating an example of a method of generating the 3D map MD.

The terminal TM generates a 3D map of surroundings of the destination TP using SLAM. The 3D map MD is generated using the video IM of surroundings of the destination TP captured so that the same position appears a plurality of times. For example, the client CL performs imaging by rotating his or her body by 360° while holding the terminal TM. The body is rotated once, the same position is imaged twice, and the two pieces of image data at the same position are used as SLAM data to perform loop closure. Loop closure increases the accuracy of the 3D map MD.

In the example of FIG. 2, the terminal TM is rotated by 360°, and imaging is performed so that the same position appears twice. However, the number of times of imaging the same position is not limited to two. Imaging may be performed such that the same position appears three or more times. In a case where the terminal TM includes the out-camera and the in-camera, the surrounding video IM may be captured by simultaneously using the out-camera and the in-camera. In this case, by rotating the terminal TM by 180°, the same position is imaged twice.

Figure 3:
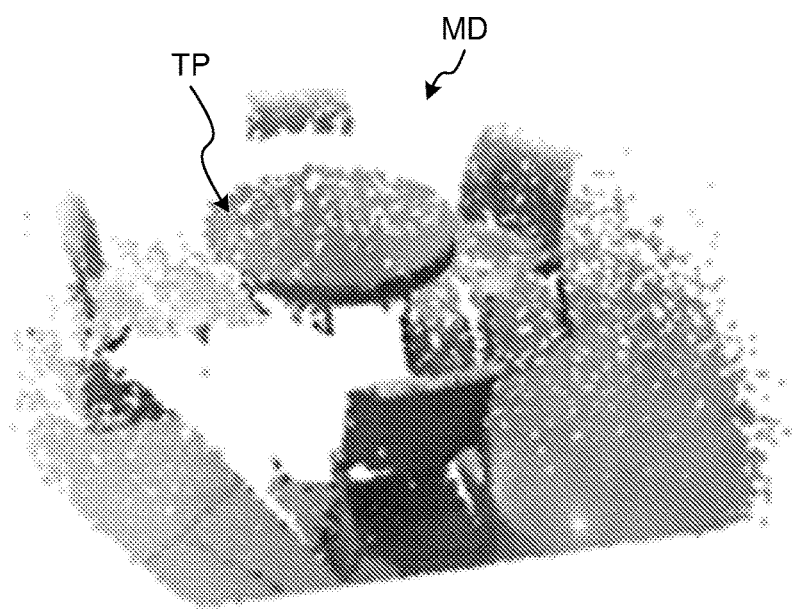
FIG. 3 is a diagram illustrating an example of a 3D map.

FIG. 3 is a diagram illustrating an example of the 3D map MD.

The terminal TM displays the 3D map MD on the touch panel. The client CL designates an any position in the 3D map MD as a delivery destination by performing a touch operation on the 3D map MD. In the example of FIG. 3, the center of the table displayed in the 3D map MD is tapped by the client CL. The terminal TM analyzes the tapped position and sets the central portion of the table as the delivery destination of the package BG. The terminal TM registers a position on the 3D map MD as a delivery destination in the 3D map MD as a destination TP. As a result, the position information about the destination TP is assigned to the 3D map MD.

3. System Configuration Example

Figure 4:
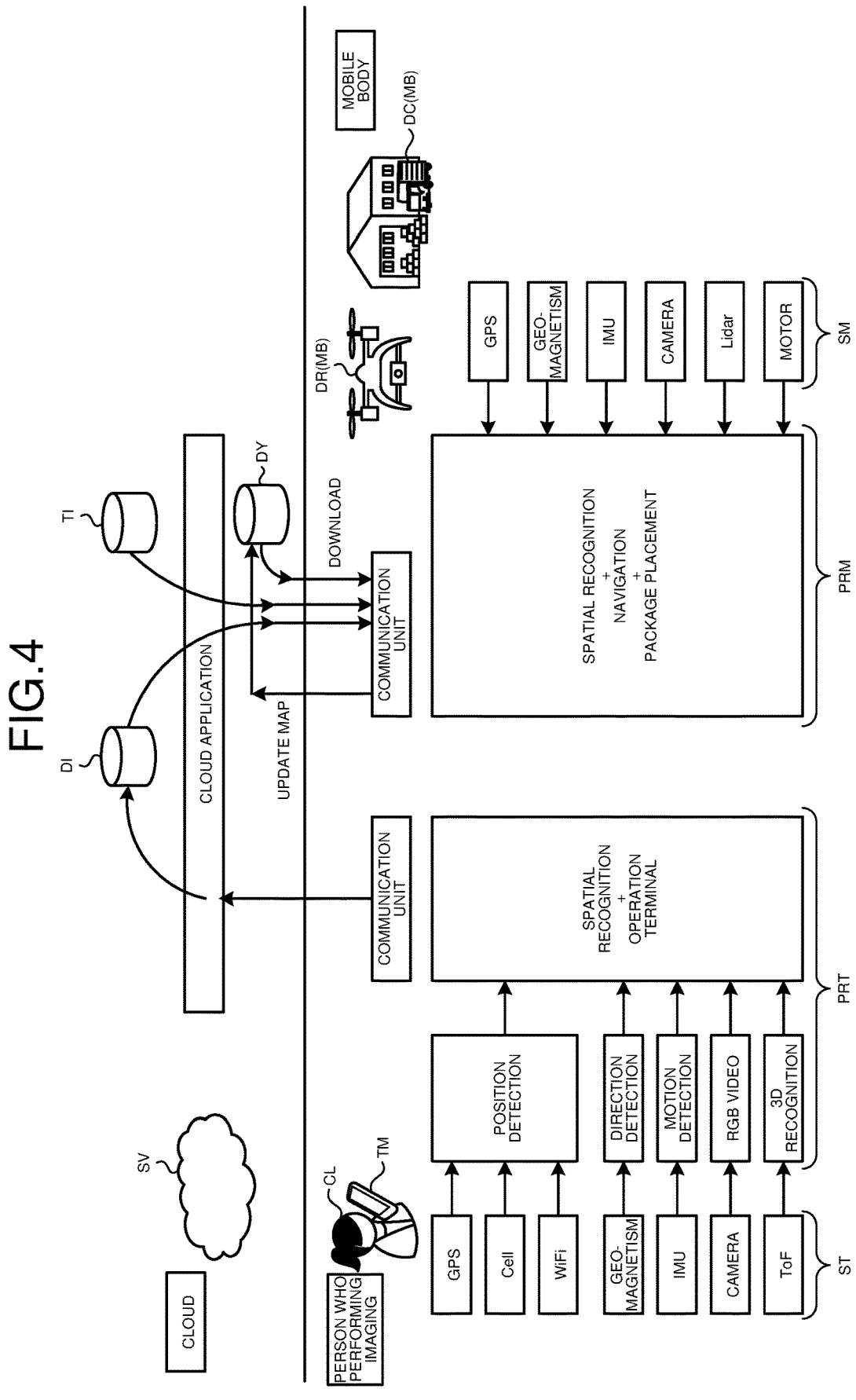
FIG. 4 is a diagram illustrating a system configuration example of a delivery system.

FIG. 4 is a diagram illustrating a system configuration example of the delivery system DS.

The terminal TM includes a sensor unit ST and a processor PRT. The sensor unit ST includes a plurality of sensors for performing SLAM. The processor PRT performs position detection, direction detection, motion detection, RGB video acquisition, and 3D recognition using the sensor information acquired from the sensor unit ST.

For example, the processor PRT detects the current location using radio waves from a GPS satellite, radio waves from a mobile phone base station, and communication with a wireless LAN access point. The processor PRT detects a direction using the geomagnetic sensor. The processor PRT detects the motion of the terminal TM using an inertial measurement unit (IMU). The processor PRT obtains a surrounding visible light video using a camera. The processor PRT performs spatial recognition using a time of flight (ToF) sensor.

The mobile body MB includes a sensor unit SM and a processor PRM. The mobile body MB may be any device provided with a movement mechanism. In the example of FIG. 4, the drone DR and the delivery vehicle DC are illustrated as the mobile body MB, but a robot such as AIBO (registered trademark) may be used. The mobile body MB functions as an information processing apparatus that processes various types of information acquired from the sensor unit SM and the like.

The sensor unit SM includes a plurality of sensors for performing SLAM and navigation. For example, the processor PRM detects the current location using radio waves from a GPS satellite. The processor PRM detects a direction using the geomagnetic sensor. The processor PRM detects the motion of the terminal TM using the IMU. The processor PRM acquires a surrounding visible light video using a camera. The processor PRM performs spatial recognition using light detection and ranging (Lidar). The processor PRM detects the operation of the actuator based on the rotation speed of the motor built in the actuator (for example, the propeller of drone DR).

Each of the terminal TM and the mobile body MB performs wireless communication with the server SV via a communication unit. The server SV includes a cloud application for implementing a delivery service. The processor PRT transmits delivery destination information DI generated by the client CL to the server SV via the cloud application. The delivery destination information DI includes the video IM of surroundings of the destination TP, the GPS data PD indicating a recording position of the video IM, and the 3D map MD of surroundings of the destination TP generated by the client CL using SLAM. The processor PRM acquires the delivery destination information DI from the server SV via the cloud application.

The processor PRM acquires traffic/weather information TI from the server SV via the cloud application. The traffic/weather information TI includes road traffic information, weather information, and disaster prevention information. The road traffic information includes real-time congestion information and restriction information about expressways and general roads, and information about future congestion prediction and schedule. The weather information includes a weather warning, a heavy rain risk level, and typhoon information. The disaster prevention information includes information about natural disasters such as earthquakes and tsunami. The processor PRM searches for a route of the mobile body MB to the destination TP in consideration of the traffic/weather information TI.

The processor PRM acquires a dynamic map DY from the server SV. The dynamic map DY is a digital map obtained by combining three-dimensional map information and position information such as congestion information and traffic restrictions. The dynamic map DY is used when the mobile body MB performs automatic driving using road information and building information.

4. Dynamic Map

FIG. 5 is a diagram illustrating an example of the dynamic map DY.

The dynamic map DY includes various pieces of information that changes from moment to moment. The information included in the dynamic map DY is classified into a plurality of layers according to ease of temporal change. For example, three-dimensional map information with relatively little temporal change, such as a road surface, a lane, and a structure, is classified as static information. Information that is more likely to change with time than static information is classified as dynamic information. The 3D map MD is generated based on video information (video information indicating static information) obtained by filtering out dynamic information that changes within the travel time to the destination TP.

The dynamic information is classified into a plurality of layers according to ease of temporal change. In the example of FIG. 5, information about the positions of roads and intersections is classified as static information. The dynamic information is classified into three layers. For example, information about the positions of the landmark, the sign, and the signal is classified into a layer (quasi-static information) with relatively little temporal change. Information about accidents, restrictions, traffic congestion, rain, and fog is classified into a layer (quasi-dynamic information) having the second smallest temporal change after the quasi-static information. The information about the position of the vehicle and the change in the signal is classified into the layer with the largest temporal change. The mobile body MB uses only the static information, the quasi-static information, and the quasi-dynamic information for the route search.

5. Route Search

Figure 6:
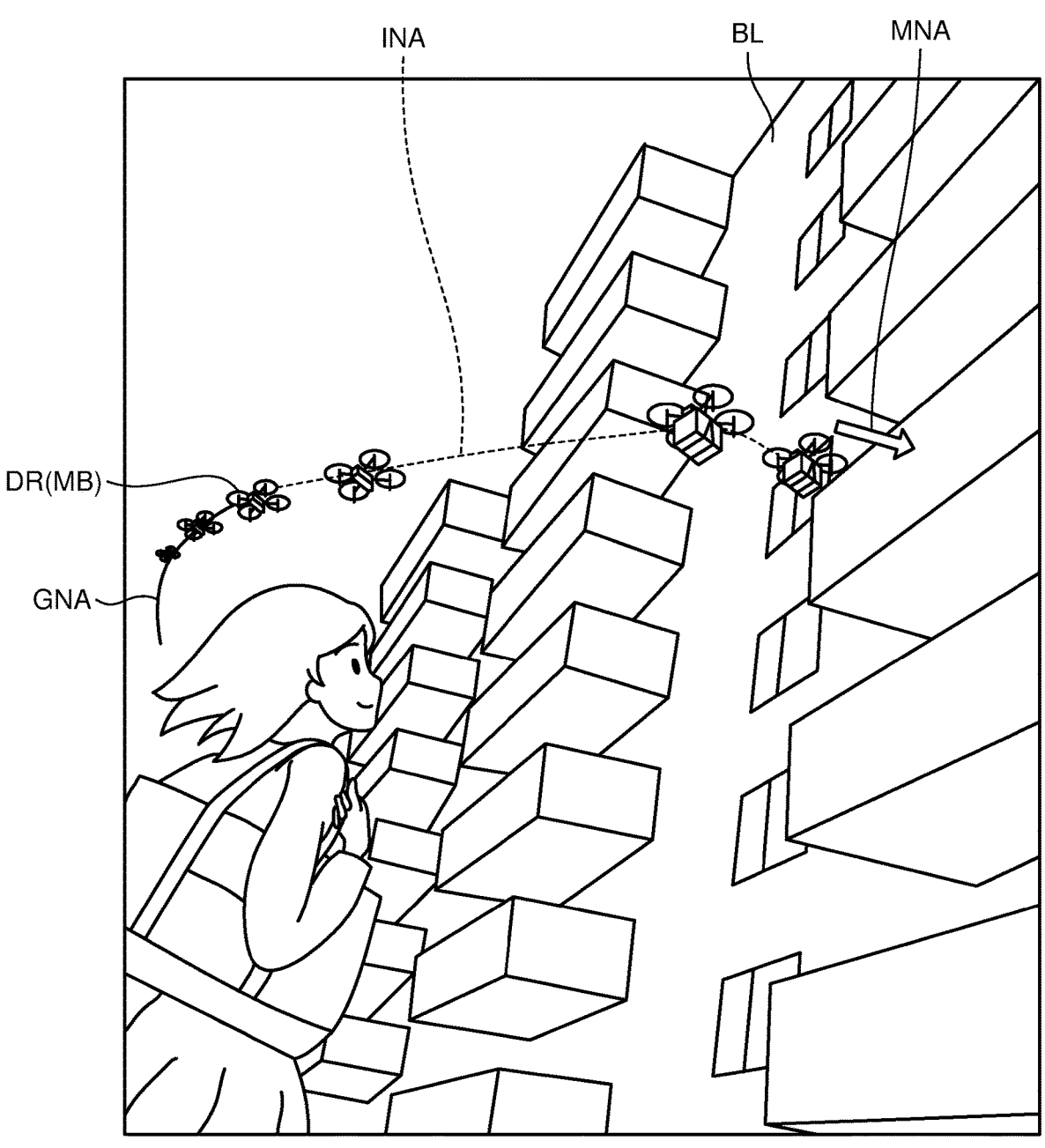
FIG. 6 is a view illustrating an example of a travelling route of a mobile body.

FIG. 6 is a diagram illustrating an example of a travelling route of the mobile body MB.

The processor PRM switches main data used for route search according to the distance to the destination TP. For example, the positioning data of the current location measured by the GPS includes an error of about several meters. The processor PRM defines a route search area to a vicinity of the destination, the vicinity being away from the destination TP by a distance (for example, 10 meters) according to a positioning error of the GPS, as a GPS search area GNA. In the GPS search area GNA, the processor PRM searches for a route to the vicinity of the destination using the GPS data PD indicating the recording position of the video IM.

When the mobile body MB reaches the vicinity of the destination, the processor PRM switches main data used for route search from the GPS data PD to the video IM and the 3D map MD. The processor PRM defines a route search area in which a route to the destination TP is capable of being searched for by the 3D map MD as a map search area MNA, and defines a route search area from the vicinity of the destination to the map search area MNA as an intermediate search area INA. In the intermediate search area INA, the processor PRM searches for a route from the vicinity of the destination to the map search area MNA using the auxiliary data including the video IM.

For example, the auxiliary data includes orientation information (compass) detected by the mobile body MB to be guided to the destination TP. The processor PRM detects the travelling direction of the mobile body MB using the orientation information. The processor PRM searches for a route in which the mobile body approaches the destination TP from a preferable direction. For example, when the destination TP is at the veranda facing the west side of the building, a route in which the mobile body approaches from west of the building is searched for.

The auxiliary data includes floor information about the destination TP. The floor information indicates the position of the room where the destination TP is located. The floor information includes, for example, information about the floor number and the room number of the room. The processor PRM detects the position of the destination TP using the floor information. For example, in a case where the destination TP is at the veranda of a specific room on the tenth floor of the building, a route in which the mobile body rises to an altitude corresponding to the tenth floor and heads to the veranda of the specific room is searched for. Note that the altitude is detected by an atmospheric pressure sensor or the like.

The auxiliary data includes information about a marker MK (see FIG. 9) installed around the destination TP. The processor PRM searches for the marker MK using the video captured by the camera of the mobile body MB. The processor PRM searches for a route in which the mobile body approaches the marker MK.

6. Information Processing Method

Hereinafter, an example of information processing performed by the delivery system DS will be described. The information processing is performed by the processor PRM and the processor PRT.

[6-1. Setting of Destination]

FIG. 7 is a flowchart illustrating an example of a method of setting the destination TP.

When the client CL purchases a product using the terminal TM (step S1), the processor PRT determines whether both the in-camera and the out-camera of the terminal TM support SLAM (step S2).

In a case where it is determined in step S2 that both the in-camera and the out-camera support SLAM (step S2: Yes), the processor PRT activates various sensors for performing SLAM including the in-camera and the out-camera (step S3). The client CL rotates his or her body by 180° while holding the terminal TM, and captures the video IM of surroundings of the destination TP. By performing imaging while rotating the fields of view of the in-camera and the out-camera by 180°, the video IM in all directions centered on the client CL is captured. The processor PRT recognizes the space using the video IM and generates the 3D map MD (step S4).

In a case where it is determined in step S2 that only the out-camera supports SLAM (step S2: No), the processor PRT activates various sensors for performing SLAM including the out-camera (step S7). The client CL rotates this or her body by 360° while holding the terminal TM, and captures the video IM of surroundings of the destination TP. By performing imaging while rotating the field of view of the out-camera by 360°, the video IM in all directions around the client CL is captured. The processor PRT recognizes the space using the video IM and generates the 3D map MD (step S8).

When the 3D map MD is generated in step S4 or step S8, the processor PRT displays the 3D map MD on the touch panel of the terminal TM. The client CL taps the position on the 3D map MD to designate the delivery destination (step S5).

The processor PRT registers the position on the 3D map MD as the delivery destination in the 3D map MD as the destination TP. The processor PRT associates the 3D map MD to which the position information about the destination TP is assigned together with the video IM and the GPS data PD with the purchased product. As a result, order data including the product, the 3D map MD, the destination TP, the video IM, and the GPS data PD is generated. In a case where the delivery destination is the home of the client CL, the address data of the client CL is also added to the order data. The address data includes floor information. The processor PRT uploads the order data to the server SV (step S6).

[6-2. Route Search and Package Delivery]

Figure 8:
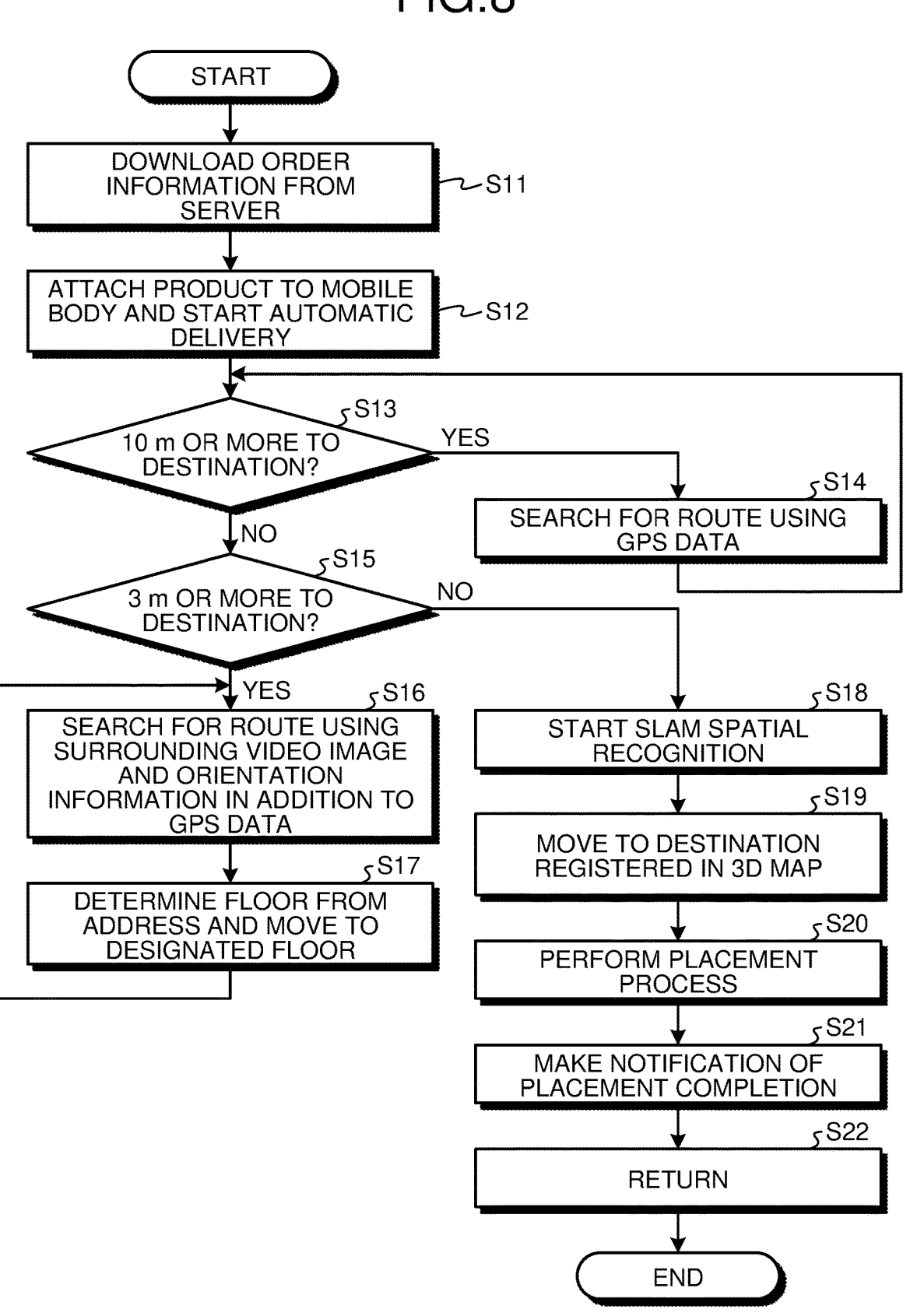
FIG. 8 is a flowchart illustrating an example of a route search and package delivery method.

FIG. 8 is a flowchart illustrating an example of a route search and a package BG delivery method.

The processor PRM downloads order data from the server SV (step S11). The courier prepares the product purchased by the client CL as the delivery package BG. The courier attaches the package BG to the mobile body MB and starts automatic delivery (step S12).

When the automatic delivery is started, the processor PRM monitors the distance to the destination TP (step S13). When the distance to the destination TP is 10 m or more (step S13: Yes), the processor PRM searches for a route to the vicinity of the destination mainly using the GPS data PD (step S14).

When the distance to the destination TP is shorter than 10 m (step S13: No), the processor PRM determines that the vehicle has reached the vicinity of the destination. The processor PRM switches main data used for a route search based on the distance to the destination TP (step S15). For example, in a case where the distance to the destination TP is 3 m or more (step S15: Yes), the processor PRM performs a route search for the destination TP using the video IM of surroundings of the destination and the orientation information in addition to the GPS data (step S16).

When the order data includes address data, the processor PRM extracts floor information from the address data. The processor PRM searches for a route toward a certain floor of the destination TP based on the floor information (step S17).

When the distance to the destination TP is shorter than 3 m (step S15: No), the processor PRM determines that the mobile body has reached the map search area MNA in which a route to the destination TP is capable of being searched for by the 3D map MD. The processor PRM performs spatial recognition using SLAM (step S18), and searches for a route for moving to the destination TP registered in the 3D map MD (step S19). The mobile body MB moves to the destination TP according to the searched route, and places the package BG at the destination TP (step S20).

When the placement of the package BG is completed, the processor PRM notifies the courier of the placement completion (step S21). Thereafter, the mobile body MB returns to the courier (step S22).

[6-3. Installation of Marker]

Figure 9:
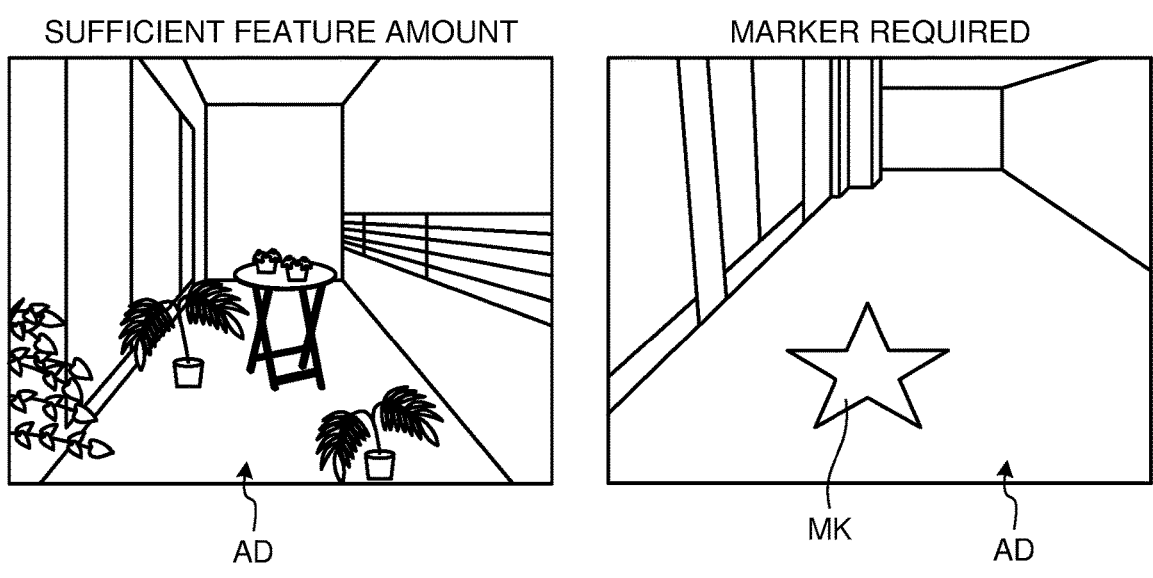
FIG. 9 is a diagram illustrating an example of a surrounding environment of a destination.

FIG. 9 is a diagram illustrating an example of a surrounding environment AD of the destination TP.

As illustrated on the left side of FIG. 9, in a case where the surrounding environment AD of the destination TP sufficiently has a distinguishing characteristic, a place where the destination TP is present is accurately identified based on the video IM of surroundings of the destination included in the order data. However, as illustrated on the right side of FIG. 9, in a case where there are few distinguishing characteristics, there is a possibility that another place (for example, another floor of the same building) having a similar structure is erroneously recognized as a place where the destination TP is present. In such a case, it is necessary to urge the client CL to install the marker MK to enhance the distinction of the surrounding environment AD.

Therefore, after the client CL captures the video IM of surroundings of the destination TP, the processor PRT determines whether the video IM sufficiently includes a distinguishing characteristic. In a case where it is determined that the video IM does not sufficiently include the distinguishing characteristic, the processor PRT urges the client CL to install the marker MK around the destination TP and capture the video IM of surroundings of the destination TP again.

Figure 10:
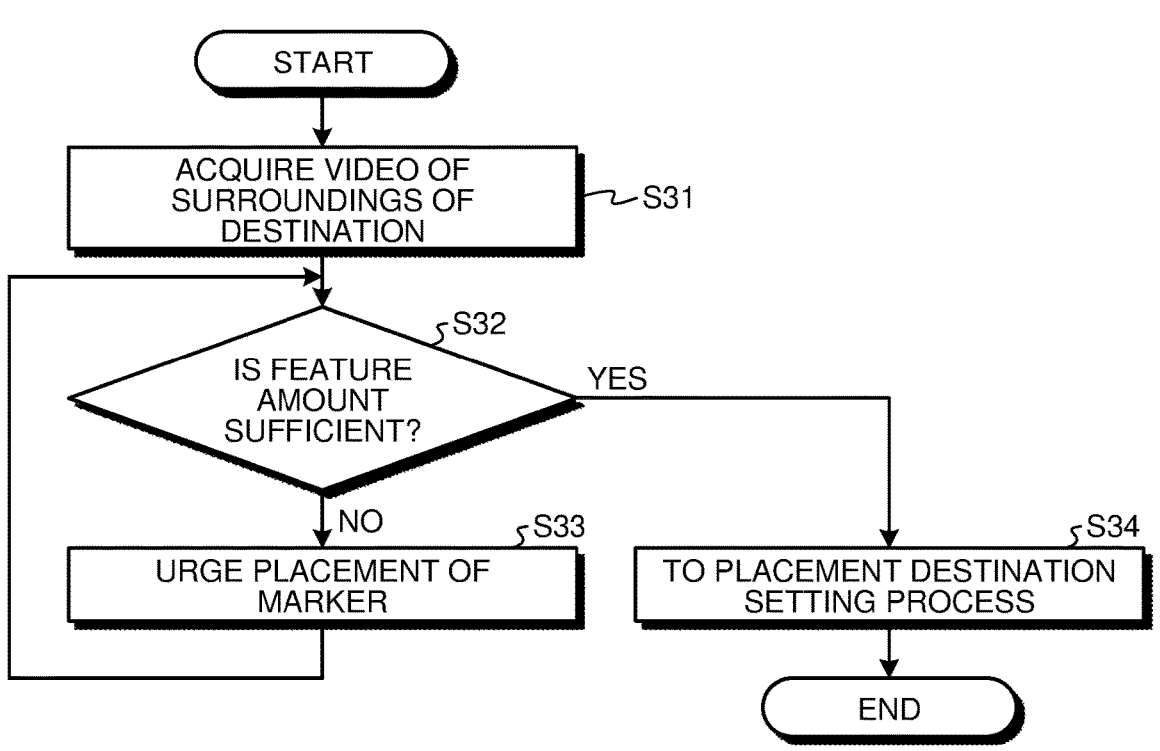
FIG. 10 is a flowchart illustrating an example of a marker installation request process.

FIG. 10 is a flowchart illustrating an example of an installation request process of the marker MK.

The processor PRT acquires the video IM of surroundings of the destination TP captured by the client CL (step S31). The processor PRT analyzes the video IM and determines whether the surrounding environment AD satisfies a predetermined identification criterion (step S32). For example, in a case where the surrounding environment AD has a sufficient feature amount exceeding a predetermined threshold value, it is determined that the identification criterion is satisfied.

In a case where it is determined that the surrounding environment AD satisfies the identification criterion (step S32: Yes), the processor PRT generates the 3D map MD using the video IM and performs setting processing of the delivery destination (destination TP) (step S34). The delivery destination setting process is similar to that illustrated in step S5 of FIG. 7.

In a case where it is determined that the surrounding environment AD does not satisfy the identification criterion (step S32: No), the processor PRT urges the client CL to install the marker MK using video or audio. The marker MK may be any marker as long as it enhances the distinction. For example, the marker MK is provided as a planar or three-dimensional structure having enhanced distinction by a combination of a picture, a character, and a color.

The client CL captures a video IM of surroundings of the destination TP where the marker MK is installed. The processor PRT performs image analysis on the video IM after the marker MK is installed, and determines whether the surrounding environment AD satisfies the identification criterion (step S32). The processor PRT repeats the above-described processing until the surrounding environment AD satisfies the identification criterion.

[6-4. Authentication of Package Recipient]

Figures 11, 12:
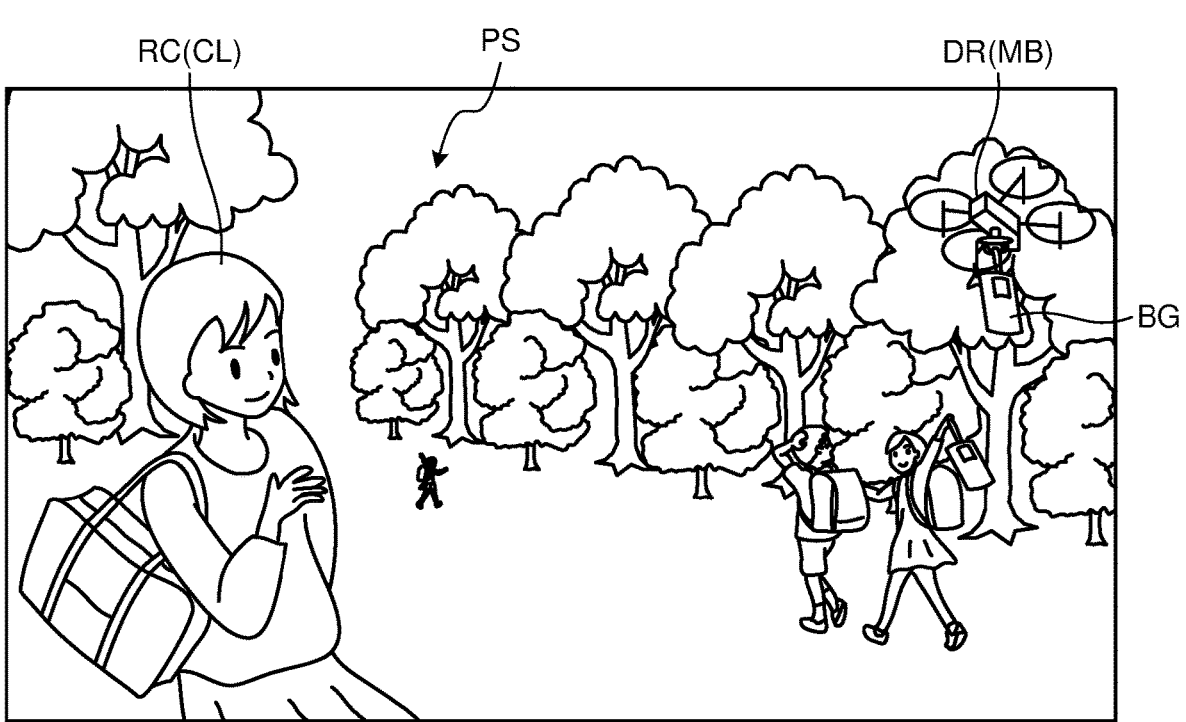
FIG. 11 is a diagram illustrating an example in which a public space is designated as a delivery destination.
FIG. 12 is a diagram illustrating a mechanism of an authentication process.

FIG. 11 is a diagram illustrating an example in which a public space PS is designated as the delivery destination.

The client CL can designate the public space PS as the delivery destination of the package BG. In the public space PS, there are many people other than a recipient RC (for example, the client CL) of the package BG. Therefore, the processor PRM authenticates the recipient RC of the package BG delivered to the destination TP.

FIG. 12 is a diagram illustrating a mechanism of an authentication process.

The recipient RC registers personal information PI necessary for the authentication process in the server SV. The personal information PI includes information about an ID of the terminal TM, a password, a physical feature (biological organ), and a behavioral feature (habit). Physical features include features such as fingerprint, palm shape, retina, iris, face, blood vessel, voice and ear shape, and the like. The behavioral feature includes a walking feature and the like.

The sensor unit SM includes a sensor necessary for the authentication process. The processor PRM performs authentication by collating the sensor information acquired from the sensor unit SM with the personal information PI registered in the server SV. When the authentication is performed, the mobile body MB delivers the package BG to the recipient RC.

The authentication process may be omitted depending on the type of the package BG. For example, for a product with a relatively low price such as a magazine, when the package BG cannot be authenticated and is brought back, the time and cost required for redelivery and the like become larger than the price of the product. In such a case, it is also possible to perform a process of placing the package BG on the destination TP without performing the authentication process.

Figure 13:
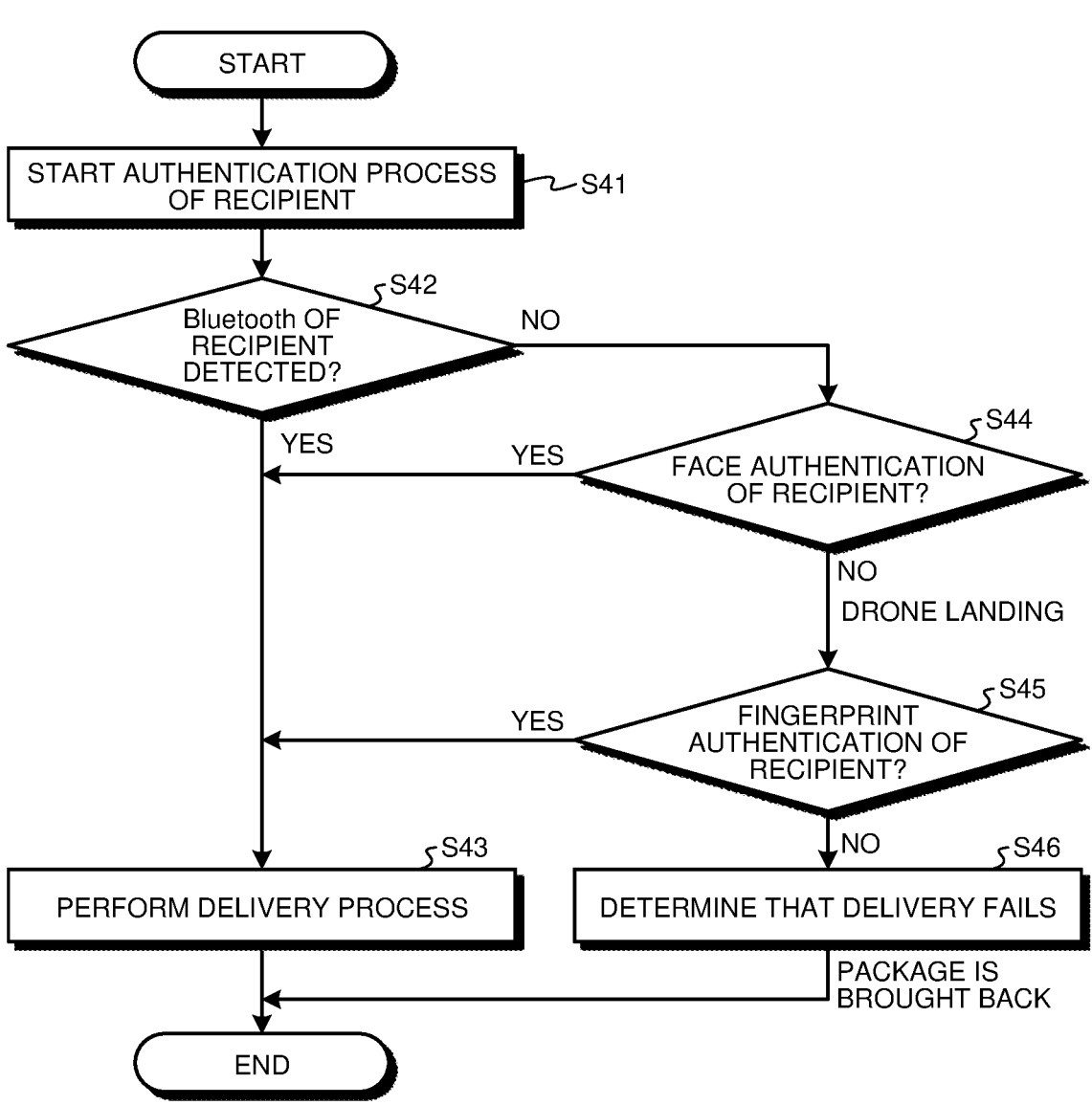
FIG. 13 is a flowchart illustrating an example of an authentication process of a recipient.

FIG. 13 is a flowchart illustrating an example of an authentication process of the recipient RC.

When the mobile body MB reaches the vicinity of the destination, the processor PRM starts an authentication process of the recipient RC (step S41). First, the processor PRM acquires the ID of the terminal TM using Bluetooth (registered trademark). The processor searches for the terminal TM of the recipient RC by collating the acquired ID with the ID registered as the personal information PI (step S42).

In a case where the terminal TM of the recipient RC is detected (step S42: Yes), the processor PRM performs a delivery process of the package BG (step S43). First, the processor PRM moves the mobile body MB to the position of the recipient RC (terminal TM). Then, the processor PRM separates the package BG from the mobile body MB and delivers the package BG to the recipient RC. When the delivery is completed, the processor PRM notifies the courier of the delivery completion. After the delivery completion notification, the mobile body MB returns to the courier.

In a case where the terminal TM of the recipient RC is not detected within a predetermined time (step S42: No), the processor PRM searches for the recipient RC from persons near the destination TP by face authentication (step S44).

When the recipient RC is detected (step S44: Yes), the processor PRM performs a delivery process of the package BG (step S43).

In a case where the recipient RC is not detected by face authentication within the predetermined time (step S44: No), the processor PRM moves to the destination TP and waits for someone to operate the sensor for fingerprint authentication. The processor PRM searches for the recipient RC from the persons who have operated the sensor by fingerprint authentication (step S45). When the recipient RC is detected (step S45: Yes), the processor PRM performs a delivery process of the package BG (step S43).

When the recipient RC is not detected by fingerprint authentication within a predetermined time (step S45: No), the processor PRM determines that the package BG cannot be delivered (step S46). The processor PRM notifies the courier of the delivery failure. After the delivery failure notification, the mobile body MB returns to the courier while holding the package BG.

[6-5. Setting of Travelling Route Inside Building]

Figure 14:
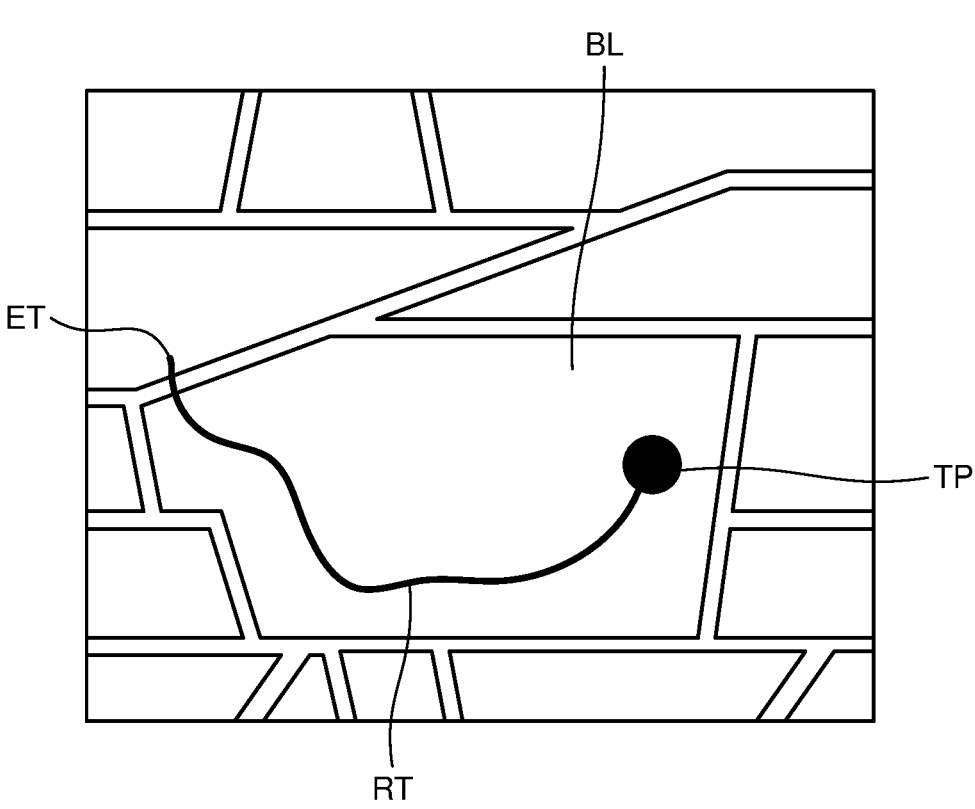
FIG. 14 is a diagram illustrating an example in which a destination is set inside a building.

FIG. 14 is a diagram illustrating an example in which the destination TP is set inside a building BL.

The autonomous movement using the GPS cannot be performed inside the building BL. Therefore, the processor PRM searches for a route to the destination TP based on the video IM showing the inside of the building BL. The video IM shows a travelling route RT from an entrance ET of the building BL to the destination TP set in the building BL.

FIG. 15 is a flowchart illustrating an example of a method of capturing the video IM.

The client CL images the surroundings of the destination TP using the camera function of the terminal TM (step S51). The processor PRT analyzes the captured video IM and determines whether the current location is inside the building (step S52). In a case where it is determined that the current location is inside the building (step S52: Yes), the processor PRT urges the client CL to move outdoors while continuing performing imaging using a video or an audio (step S53).

After capturing an image of the surroundings of the destination TP according to the guidance of the processor PRT, the client CL moves toward the entrance ET of the building BL while continuing performing imaging. The processor PRT continues the spatial recognition process by SLAM while the client CL moves inside the building BL (step S54).

While the client CL moves inside the building BL, the processor PRT determines whether the current location is inside the building based on the captured video IM (step S52). In a case where it is determined that the current location is outside the building (step S52: No), the processor PRI ends performing imaging. The processor PRT acquires the GPS data PD at the position where imaging has been completed (for example, the position of the entrance of the building BL) as the recording position of the video IM (step S55).

The processor PRT generates order data using a method similar to steps S5 and S6 in FIG. 7 and uploads the order data to the server SV (step S56).

7. Search for Meeting Place

Figure 16:
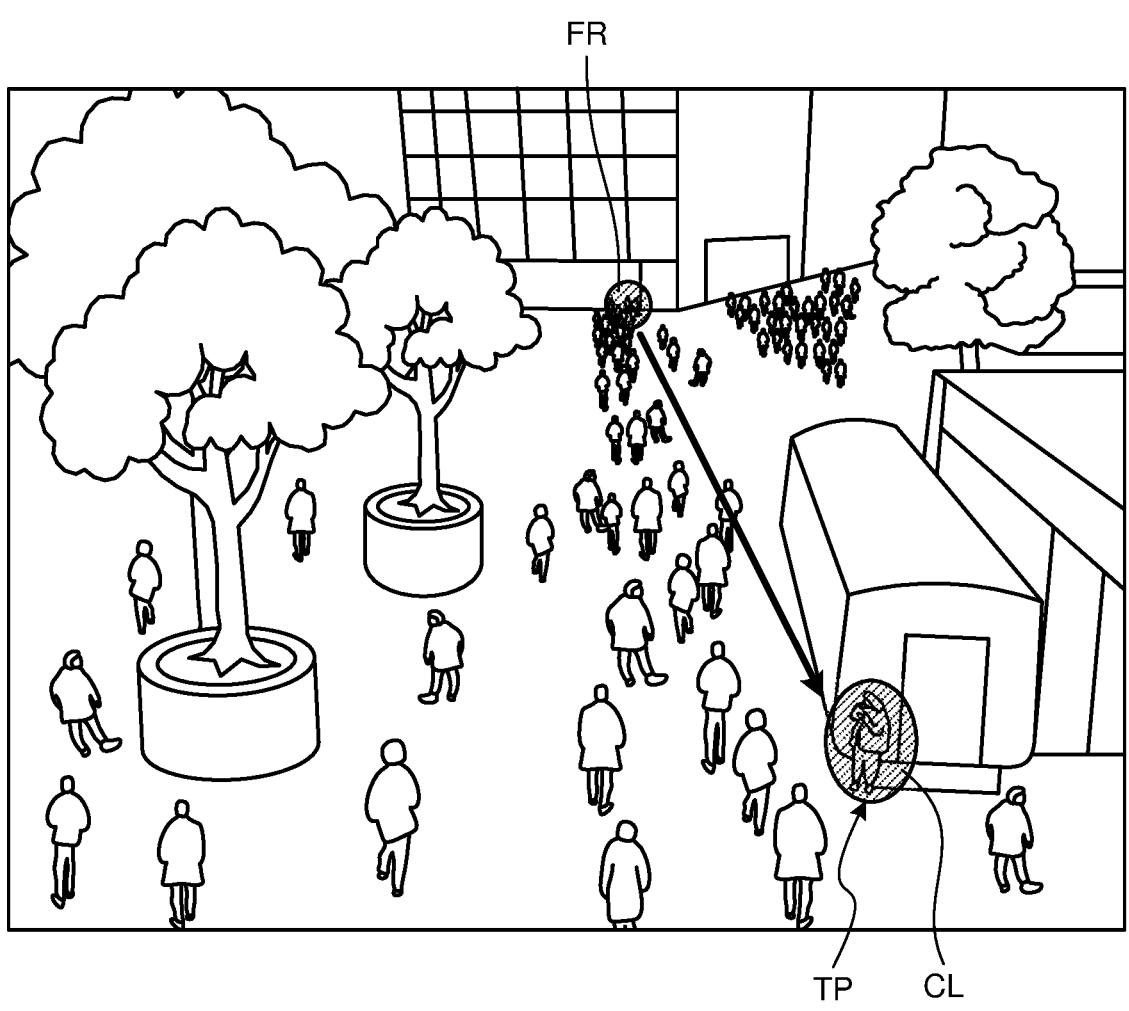
FIG. 16 is a diagram illustrating an example in which a route search method using a 3D map is applied to meeting with a friend.

FIG. 16 is a diagram illustrating an example in which a route search method using the 3D map MD is applied to meeting with a friend FR.

In the example of FIG. 16, the meeting place is set as the destination TP. The client CL generates the 3D map MD from the video IM of surroundings of the meeting place using SLAM. The client CL taps the position on the 3D map MD displayed on the terminal TM to designate the meeting place. The processor PRT generates meeting data including the 3D map MD, the destination TP, the video IM, and the GPS data PD, and uploads the meeting data to the server SV.

In a place where there are many people, there is a possibility that a passerby appears in the video IM. In this case, it is desirable to filter out dynamic information such as passersby by imaging the same place a plurality of times. As a result, the accurate 3D map MD is generated.

The friend FR uses a terminal such as augmented reality (AR) glasses as a navigation device. The navigation device includes the processor PRM described above. The processor PRM acquires the meeting data from the server SV and searches for a route to the meeting data place by a method similar to the method described above. Static information, quasi-static information, and quasi-dynamic information of the dynamic map DY can be used for the route search. The processor PRM presents the searched route to the friend FR and guides the friend FR to the meeting place.

8. Hardware Configuration Example

Figure 17:
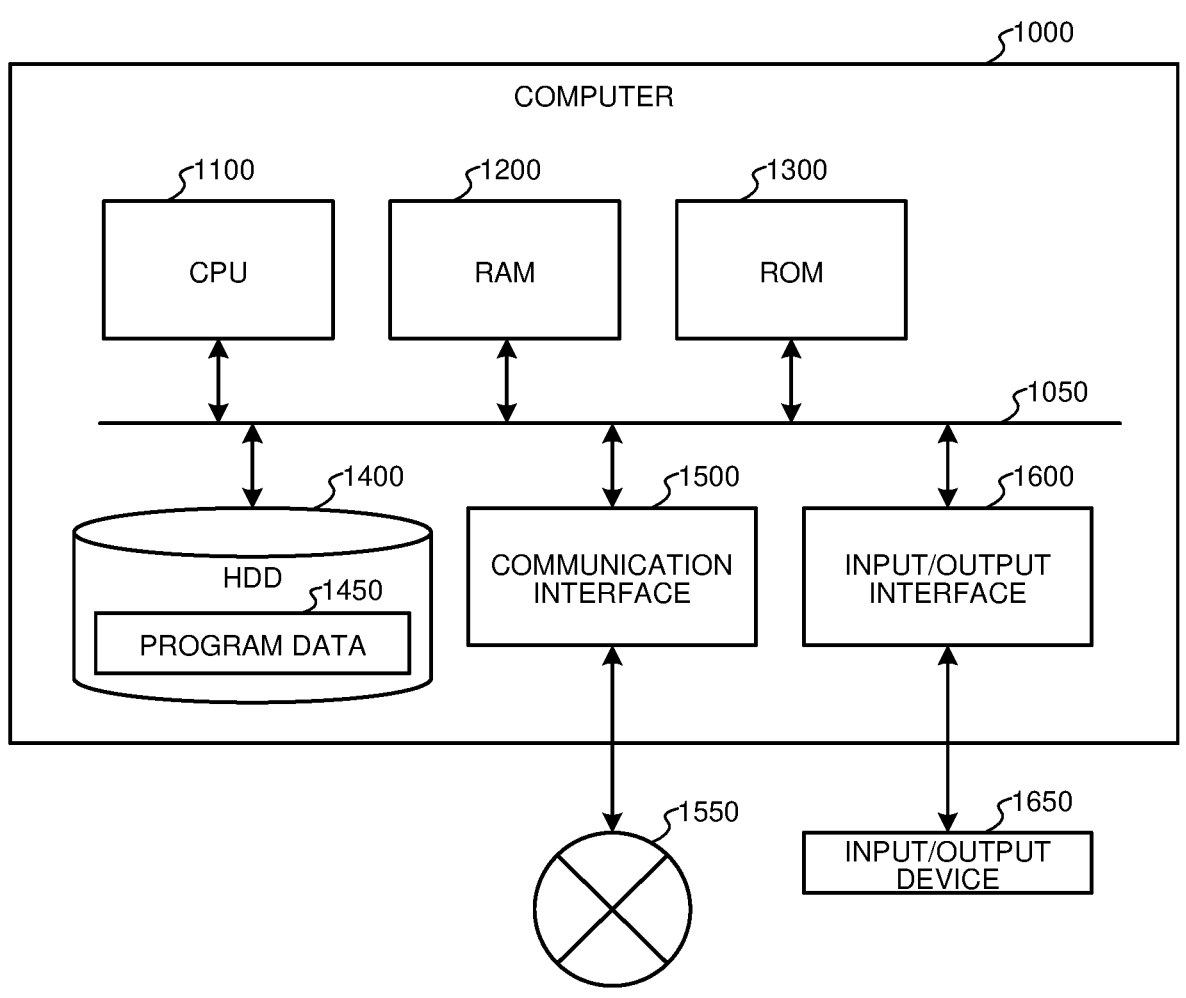
FIG. 17 is a diagram illustrating an example of a hardware configuration of a processor.

FIG. 17 is a diagram illustrating an example of a hardware configuration of the processor PRM.

The processor PRM is implemented by a computer 1000 having a configuration as illustrated in FIG. 17, for example. The computer 1000 includes a CPU 1100, a RAM 1200, a read only memory (ROM) 1300, a hard disk drive (HDD) 1400, a communication interface 1500, and an input/output interface 1600. Respective units of the computer 1000 are connected by a bus 1050.

The CPU 1100 operates based on a program stored in the ROM 1300 or the HDD 1400, and controls each unit. For example, the CPU 1100 develops a program stored in the ROM 1300 or the HDD 1400 in the RAM 1200, and performs a process corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable non-transitory recording medium that non-transiently records programs executed by the CPU 1100, data used by the programs, and the like. Specifically, the HDD 1400 is a recording medium that records an information processing program according to the present disclosure which is an example of program data 1450.

The communication interface 1500 is an interface for the computer 1000 to be connected to an external network 1550 (for example, the Internet). For example, the CPU 1100 receives data from another device or transmits data generated by the CPU 1100 to another device via the communication interface 1500.

The input/output interface 1600 is an interface that connects an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the processor PRM, the CPU 1100 of the computer 1000 realizes the functions of the processor PRM by executing the information processing program loaded on the RAM 1200. In addition, the HDD 1400 stores an information processing program according to the present disclosure, parameter information used for various types of information processing, and the like. The CPU 1100 reads the program data 1450 from the HDD 1400 and executes the program data, but as another example, the program may be acquired from another device via the external network 1550.

9. Effects

The mobile body MB includes the processor PRM. The processor PRM searches for a route to the destination TP using the 3D map MD of surroundings of the destination TP generated by the client CL using SLAM. In the processing method of the present disclosure, processing of the mobile body MB is executed by a computer. The program of the present disclosure causes a computer to realize processing of the mobile body MB.

According to this configuration, the route search is performed using the highly accurate 3D map MD. Therefore, an accurate route search is performed. The destination TP is designated using the 3D map MD. Therefore, an any position can be set as the destination TP.

The 3D map MD is generated using the video IM of surroundings of the destination TP captured so that the same position appears a plurality of times.

According to this configuration, the accurate 3D map MD is generated by loop closure. Therefore, a route to the destination TP is accurately searched for.

The video IM shows a travelling route RT from an entrance ET of the building BL to the destination TP set in the building BL.

According to this configuration, even when the destination TP is set inside the building BL having a complicated internal structure, the route to the destination TP is accurately searched for.

The 3D map MD is generated based on video information obtained by filtering out dynamic information that changes within the travel time to the destination TP.

According to this configuration, a decrease in search accuracy due to dynamic information hardly occurs.

The processor PRM searches for a route to the surroundings of the destination TP using the GPS data PD indicating the recording position of the video IM.

According to this configuration, the route search to the destination TP is performed in stages while switching the search method. In the route search using the GPS data PD, the positioning accuracy is low, but the processing load of the processor PRM is small. In the route search using the 3D map MD, the positioning accuracy is high, but the processing load of the processor PRM is large. By switching the search method according to the distance to the destination TP, the accuracy of the route search can be improved while suppressing the processing load of the processor PRM.

The processor PRM searches for a route from the surroundings of the destination TP to the map search area MNA using the auxiliary data including the video IM. The map search area MNA is an area where a route to the destination TP is capable of being searched for by the 3D map MD.

According to this configuration, a route to the map search area MNA is accurately searched for.

The auxiliary data includes orientation information detected by the mobile body MB to be guided to the destination TP.

According to this configuration, a route in which the mobile body approaches the destination TP is searched for with high accuracy based on the video IM of surroundings of the destination TP and orientation information.

The auxiliary data includes floor information about the destination TP.

According to this configuration, the position of the destination TP is accurately identified.

The auxiliary data includes information about the marker MK installed around the destination TP.

According to this configuration, a route to the map search area MNA is accurately searched for using the marker MK as a mark.

The processor PRM authenticates the recipient RC of the package BG delivered to the destination TP.

According to this configuration, even when the destination TP is set in the public space PS, the package BG can be reliably delivered to the recipient RC.

Further, the effects described in the present identification are merely examples and are not limited, and other effects may be present.

10. Modification

In the above-described embodiment, the information processing related to the route search is performed by the mobile body MB. However, the information processing related to the route search may be performed by the server SV. For example, the server SV may perform a route search based on various types of information uploaded from the terminal TM to transmit the searched route to the mobile body MB.

Supplementary Note

The present technology may also be configured as below.
(1)

An information processing apparatus comprising: a processor that searches for a route to a destination using a map of surroundings of the destination generated by a client using SLAM.
(2)

The information processing apparatus according to (1), wherein the 3D map is generated using a video of surroundings of the destination imaged so that a same position appears a plurality of times.
(3)

The information processing apparatus according to (2), in which the 3D map is generated using the video obtained by imaging a travelling route from an entrance of a building to the destination set inside the building.
(4)

The information processing apparatus according to (2) or (3), wherein the 3D map is generated based on information obtained by filtering out dynamic information that changes within a travel time to the destination.
(5)

The information processing apparatus according to any one of (2) to (4), in which the processor searches for a route to surroundings of the destination using GPS data indicating a recording position of the video.
(6)

The information processing apparatus according to (5), wherein the processor searches for a route from the vicinity of the destination to a map search area where a route to the destination is capable of being searched for by the 3D map using auxiliary data including the video.
(7)

The information processing apparatus according to (6), wherein the auxiliary data includes orientation information detected by a mobile body to be guided to the destination.
(8)

The information processing apparatus according to (6) or (7), wherein the auxiliary data includes floor information about the destination.
(9)

The information processing apparatus according to any one of (6) to (8), wherein the auxiliary data includes information about a marker installed around the destination.
(10)

The information processing apparatus according to any one of (1) to (9), wherein the processor authenticates a recipient of a package delivered to the destination.
(11)

An information processing method executed by a computer, the method comprising: searching for a route to a destination using a 3D map of surroundings of the destination generated by a client using SLAM.
(12)

A program for causing a computer to search for a route to a destination using a 3D map of surroundings of the destination generated by a client using SLAM.

REFERENCE SIGNS LIST

BG PACKAGE
BL BUILDING
CL CLIENT
ET ENTRANCE
IM VIDEO
MB MOBILE BODY (INFORMATION PROCESSING APPARATUS)
MD 3D MAP
MK MARKER
MNA MAP SEARCH AREA
PD GPS DATA
PRM PROCESSOR
RC RECIPIENT
RT TRAVELLING ROUTE
TP DESTINATION

The invention claimed is:

1. An information processing apparatus, comprising:
a processor configured to:
receive order data from a server;
determine distance information associated with a destination based on global positioning system (GPS) data, wherein the order data includes the destination;
switch from utilization of the GPS data to utilization of main data, based on the distance information;

execute a simultaneous localization and mapping (SLAM) process based on the main data and a 3D map of surroundings of the destination;

search for a first route to the destination based on the execution of the SLAM process; and control movement of a mobile body to the destination based on the searched first route to the destination.

2. The information processing apparatus according to claim 1, wherein the 3D map is generated based on execution of imaging process of a video of surroundings of the destination, and a same position of the surroundings appears a plurality of times in the video.

3. The information processing apparatus according to claim 2, wherein the video includes a travelling route from an entrance of a building to the destination set inside the building.

4. The information processing apparatus according to claim 2, wherein the 3D map is generated based on video information, and the video information is obtained based on exclusion of dynamic information that changes within a travel time of the mobile body to the destination.

5. The information processing apparatus according to claim 2, wherein the processor is further configured to search for a second route to a vicinity of the destination based on the GPS data, the GPS data indicates a recording position of the video, and the vicinity of the destination is away from the destination by a distance based on a positioning error of a GPS.

6. The information processing apparatus according to claim 5, wherein the processor is further configured to:

search for a third route from the vicinity of the destination to a map search area; and search the first route to the destination based on the 3D map in the map search area, wherein the first route to the destination is searched in the map search area based on auxiliary data that includes the video.

7. The information processing apparatus according to claim 6, wherein the processor is further configured to:

detect orientation information as the auxiliary data; and control the movement of the mobile body to the destination based on the orientation information.

8. The information processing apparatus according to claim 6, wherein the auxiliary data includes floor information about the destination.

9. The information processing apparatus according to claim 6, wherein the auxiliary data includes information about a marker installed around the destination.

10. The information processing apparatus according to claim 1, wherein the processor is further configured to authenticate a recipient of a package delivered to the destination.

11. An information processing method executed by a computer, the method comprising:

receiving order data from a server;

determining distance information associated with a destination based on global positioning system (GPS) data, wherein the order data includes the destination;

switching from utilization of the GPS data to utilization of main data, based on the distance information;

executing a simultaneous localization and mapping (SLAM) process based on the main data and a 3D map of surroundings of the destination;

searching for a route to the destination based on the execution of the SLAM process; and controlling movement of a mobile body to the destination based on the searched route to the destination.

12. A non-transitory computer-readable medium having stored thereon, computer-executable instructions which, when executed by a computer, cause the computer to execute operations, the operations comprising:

receiving order data from a server;

determining distance information associated with a destination based on global positioning system (GPS) data, wherein the order data includes the destination;

switching from utilization of the GPS data to utilization of main data, based on the distance information;

executing a simultaneous localization and mapping (SLAM) process based on the main data and a 3D map of surroundings of the destination;

searching for a route to the destination based on the execution of the SLAM process; and controlling movement of a mobile body to the destination based on the searched route to the destination.

\* \* \* \* \*